(12) United States Patent
Kratschmar et al.

(10) Patent No.: US 8,262,285 B2
(45) Date of Patent: Sep. 11, 2012

(54) DEVICE FOR MEASURING GAS OR AIR TEMPERATURE IN A CASING BOX

(75) Inventors: Rudiger Kratschmar, Heddesheim (DE); Ralf Graf, Mannheim (DE); Hans-Peter Merkel, Schriesheim (DE)

(73) Assignee: ABB AG, Mannheim (DE)

( * ) Notice: Subject to any disclaimer, the term of this patent is extended or adjusted under 35 U.S.C. 154(b) by 869 days.

(21) Appl. No.: 12/298,719

(22) PCT Filed: Apr. 19, 2007

(86) PCT No.: PCT/EP2007/003443
§ 371 (c)(1),
(2), (4) Date: Oct. 27, 2008

(87) PCT Pub. No.: WO2007/124871
PCT Pub. Date: Nov. 8, 2007

(65) Prior Publication Data
US 2009/0097190 A1    Apr. 16, 2009

(30) Foreign Application Priority Data
Apr. 27, 2006 (DE) .................. 10 2006 019 578

(51) Int. Cl.
*G01K 1/02* (2006.01)
*G01K 3/06* (2006.01)
*H02B 11/00* (2006.01)
(52) U.S. Cl. .... 374/166; 374/152; 374/208; 374/E1.005
(58) Field of Classification Search .................. 374/29, 374/30, 135, 137, 152, 166, 183, 185, 189, 374/204, 208, E1.001, E1.005, E13.001; 361/605
See application file for complete search history.

(56) References Cited

U.S. PATENT DOCUMENTS

| 3,382,714 | A  | * | 5/1968  | Miller et al. ............... 374/29 |
| 4,384,793 | A  | * | 5/1983  | O'Brien .................... 374/115 |
| 4,488,269 | A  | * | 12/1984 | Robinson et al. .......... 136/213 |
| 5,261,747 | A  |   | 11/1993 | Deacutis et al. |
| 5,902,044 | A  | * | 5/1999  | Pricer et al. .............. 374/112 |
| 6,175,498 | B1 | * | 1/2001  | Conroy et al. ............. 361/704 |
| 6,639,794 | B2 | * | 10/2003 | Olarig et al. ............ 361/679.48 |
| 7,510,323 | B2 | * | 3/2009  | Rahman et al. ............ 374/163 |
| 7,563,024 | B2 | * | 7/2009  | Rotem et al. ............. 374/183 |

(Continued)

FOREIGN PATENT DOCUMENTS

DE    3420695    12/1985

(Continued)

OTHER PUBLICATIONS

European Patent Office, International Search Report in International Patent Application No. PCT/EP2007/003443 (Jun. 29, 2007).

(Continued)

*Primary Examiner* — R. A. Smith
(74) *Attorney, Agent, or Firm* — Leydig, Voit & Mayer, Ltd.

(57) ABSTRACT

A device for measuring gas temperature in a casing box having different heat-generating units disposed therein. The device includes a temperature-measuring arrangement disposed substantially in a plane above the different heat-generating units. The temperature-measuring arrangement includes a matrix of uniformly distributed temperature sensors configured to measure a temperature of rising gas.

17 Claims, 2 Drawing Sheets

U.S. PATENT DOCUMENTS

| | | | |
|---|---|---|---|
| 8,016,480 B2 * | 9/2011 | Lozinski et al. | 374/29 |
| 2006/0037331 A1 * | 2/2006 | Nicolai et al. | 62/129 |
| 2006/0225449 A1 * | 10/2006 | Dorrich et al. | 62/259.2 |
| 2006/0245914 A1 | 11/2006 | Adam | |
| 2010/0214124 A1 * | 8/2010 | Lozinski et al. | 340/870.17 |

FOREIGN PATENT DOCUMENTS

| | | |
|---|---|---|
| DE | 3815619 A1 * | 11/1989 |
| DE | 4123870 | 1/1993 |
| DE | 102006052039 A1 * | 5/2008 |
| DE | 102007019925 A1 * | 11/2008 |
| EP | 1510656 | 3/2005 |
| GB | 2284261 | 5/1995 |
| JP | 56012522 | 2/1981 |
| JP | 63292028 | 11/1988 |
| JP | 01274606 A * | 11/1989 |
| JP | 03134528 | 6/1991 |
| JP | 03162638 | 7/1991 |
| JP | 05026739 | 2/1993 |
| JP | 05052666 | 3/1993 |
| JP | 05273052 | 10/1993 |
| JP | 08304188 | 11/1996 |
| JP | 2003033262 | 2/2003 |
| SU | 620841 A * | 7/1978 |

OTHER PUBLICATIONS

German Search Report for DE 10 2006 019 578.7, (Sep. 4, 2006).

* cited by examiner

DEVICE FOR MEASURING GAS OR AIR TEMPERATURE IN A CASING BOX

CROSS REFERENCE TO RELATED APPLICATIONS

This application is a U.S. National Phase application under 35 U.S.C. §371 of International Application No. PCT/EP2007/003443, filed on Apr. 19, 2007 and claims benefit to German Patent Application No. DE 10 2006 019 578, filed on Apr. 27, 2006. The International Application was published in German on Nov. 8, 2007 as WO 2007/124871 under PCT Article 21 (2).

FIELD

The invention relates to a device for measuring temperature in a casing box, and particularly relates to a device for use in an electrical switchgear cabinet for low voltage.

BACKGROUND

Switchgear cabinets for low voltage typically have a frame composed of profiled bars which are terminated by walls which are connected to them, namely side walls, a rear wall, a top wall and a bottom wall. Situated inside the switchgear cabinet, which can be closed from the outside by means of a door, are with drawable parts which are on different planes and to which electrical units, for example control, switching and regulating units, are in turn applied. These units generate heat which heats the air or gas inside the switchgear cabinet, a thermal convection flow forming inside the switchgear cabinet.

In order to measure the air or gas temperature, a temperature-measuring sensor is situated on each withdrawable part, said sensor being fitted to the base in the upper region of the withdrawable part, to be precise where there is sufficient space for this sensor. This means that, when a unit which is arranged away from the temperature-measuring sensor—and there is optionally another unit between the unit in question and the temperature-measuring sensor—heats up to an impermissible extent, a change in the temperature of the first unit is detected by the temperature-measuring sensor only with a great delay. In this case, it is only determined that the temperature inside the switchgear cabinet has increased; this does not make it possible to detect which unit, if appropriate in which withdrawable part, has reached impermissibly high temperatures.

SUMMARY

An aspect of the present invention is to provide a device for measuring gas temperature in a casing box which makes it possible to accurately detect a unit which is generating impermissible temperatures.

In an embodiment, the present invention provides a device for measuring gas temperature in a casing box having different heat-generating units disposed therein. The device includes a temperature-measuring arrangement disposed substantially in a plane above the different heat-generating units. The temperature-measuring arrangement including a matrix of uniformly distributed temperature sensors configured to measure a temperature of rising gas.

BRIEF DESCRIPTION OF THE DRAWINGS

Exemplary embodiments along with refinements of the invention will be described in more detail in the following with reference to the drawings, in which.

DETAILED DESCRIPTION

In an embodiment of the invention, a temperature-measuring arrangement is provided above the units approximately on one plane and has a plurality of temperature-measuring sensors which are arranged at uniformly distributed spaces arranged in the form of a matrix and are used to measure the temperatures of the rising air or the gas.

The invention utilizes the fact that the air heated by the units or the heated gas rises and a convection flow is thus produced inside the casing box. If the temperature-measuring sensors or temperature sensors are arranged above the units, the temperature sensors above that unit which has heated up to an impermissible extent can immediately detect the increased temperature; this avoids a time delay between the beginning of the impermissible heating of the unit in question and the response of the temperature sensor on account of gas or air mixing which is produced by convection inside the casing box and takes up a certain amount of time.

A carrier to which the temperature sensors are fitted can be provided in an advantageous manner.

In order to distribute the temperature sensors in a uniform manner, they are arranged on the carrier in the form of a mesh or grid. This results in a temperature-measuring sensor always being above each unit.

The temperature-measuring sensors may be in the form of thermosensors which are fastened to a carrier; the temperature-measuring sensors may also be in the form of resistance wires which have different resistance values, are arranged on one plane in the form of a mesh and are composed of a material whose resistance changes as the temperature changes.

The temperature-measuring arrangement having the individual temperature-measuring sensors or temperature sensors is a two-dimensional measuring arrangement which can be used wherever a plurality of units need to be monitored for increases in temperature.

As a result of the fact that the resistance wires are arranged in the form of a mesh, it is possible to determine the region in which the temperature rises excessively, with the result that a switching unit can be driven in a corresponding manner or an alarm device can be driven.

The device can be used in all types of casing boxes and anywhere in those spaces in which two-dimensional temperature detection is required and in which units which generate relatively high temperatures during faulty operation are accommodated. This may be the case, for example, in an electronic data processing device.

Figure 1:
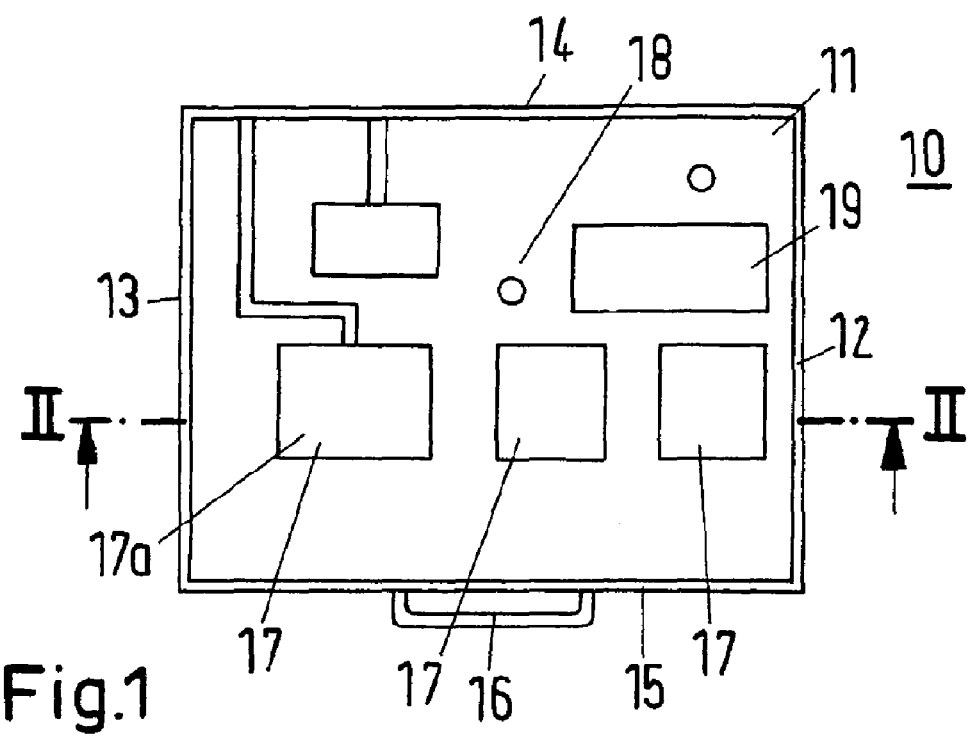
FIG. 1 shows a view into a withdrawable part used in a low-voltage switchgear cabinet.

FIG. 1 illustrates a plan view of a withdrawable part 10 as can be used in a low-voltage switchgear cabinet. This withdrawable part has a bottom plate 11 as well as walls 12, 13, which project perpendicularly at the edges of the bottom plate 11 and form the side walls, as well as walls 14 and 15, the wall 14 of which forms the rear wall and the wall 15 of which forms the front wall to which a handle 16 is fitted. A plurality of electrical control, switching and regulating units 17, through which, as electrical units, the current flows and which also generate heat in the process, are arranged on the bottom plate 11. There is usually air in the switchgear cabinet in which the withdrawable part is situated, the switchgear cabinet being closed with respect to the ambient atmosphere, but not being encapsulated hermetically and in a gas-tight manner.

The effect of the electrical units on the atmosphere inside the switchgear cabinet results in convection, with the result that the heated air rises and produces a type of circulating flow inside the switchgear cabinet or, if appropriate, also inside the individual withdrawable part, depending on the configuration of the bottom plate 11.

In order to measure the air temperatures produced in this case, other devices only include a temperature sensor 18 which, in the refinement according to the exemplary embodiment shown in FIG. 1, is arranged approximately in the center of the withdrawable part 10. Temperature increases, for example in the switching unit or control unit 17 on the right, are detected by the temperature sensor 18 only after a certain delay time.

The arrangement of the temperature sensor 18 in the switchgear assemblies or withdrawable parts which are currently being produced and are in use is dependent on the space distribution inside the withdrawable part.

Figure 2:
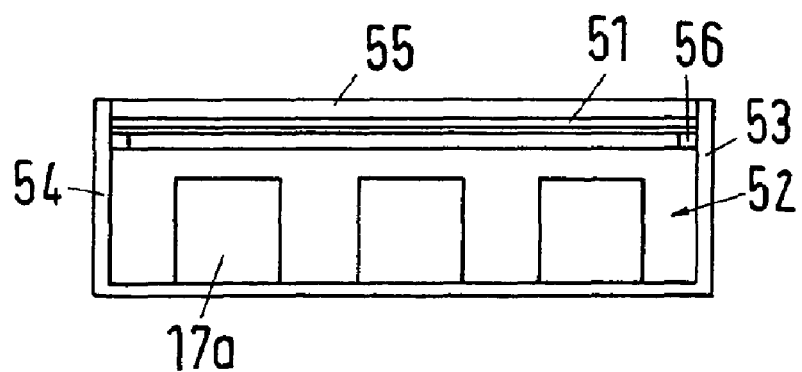
FIG. 2 shows a cross section of a withdrawable part according to the invention in accordance with section line II-II shown in FIG. 1.
Figure 3:
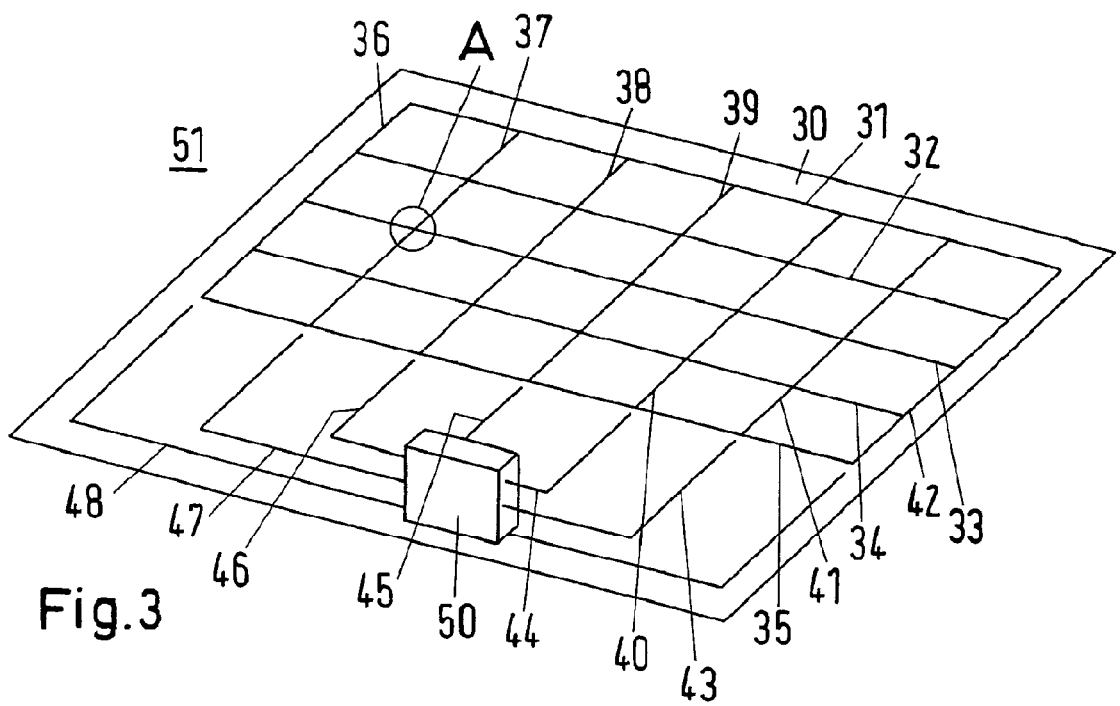
FIGS. 3 to 5 show three different exemplary embodiments of the invention.

In FIG. 3, resistance wires 31, 32, 33, 34 and 35 which run at a distance from one another and parallel to one another and each have different resistance values are arranged on a carrier 30. Further resistance wires which likewise run parallel to one another and at a distance from one another are arranged perpendicular to the resistance wires 31 to 35. The resistance wires are connected to an evaluation device 50 by means of connecting lines 43 to 48, only the connecting lines 43 to 48 from the resistance wires 36 to 42 to the evaluation device being illustrated here; the corresponding connecting lines between the resistance wires 31 to 35 and the evaluation device 50 are not illustrated for the sake of clarity. This temperature-measuring unit 51 is inserted into the withdrawable part 52 shown in FIG. 2, the withdrawable part 52 having strips 56 which run around on the insides of the walls 53, 54 and 55 and whose clear width is smaller than the outer circumference of the sensor arrangement 51, with the result that the sensor arrangement or temperature-measuring unit 51 can be placed onto the circumferential strip 56.

It goes without saying that the carrier 30 must have sufficiently large apertures, which are likewise not illustrated, so that the air heated by the electrical units 17 and 19 can flow past the resistance wires 31, 32, 33, 34, 35.

In the embodiment shown in FIG. 3, the resistance wires 31, 32, 33, 34 and 35 run parallel to the front wall of the withdrawable part 10 and the other resistance wires 36 to 42 run perpendicular thereto, which entails advantages, as shall be explained in more detail further below. It goes without saying that it is also easily possible to arrange the resistance wires in such a manner that they run at an angle that is not equal to 90° to one another. This essentially depends on the arrangement of the units 17, 17a and 19 in the withdrawable part 10.

It shall now be assumed that the electrical unit 17a depicted on the left in FIG. 2 of the drawing heats up excessively. Since the unit 17a is under the resistance wire 37 and approximately under the resistance wire 33, these two resistance wires are heated to a greater extent than the remaining resistance wires because the air heated by the unit 17a flows directly past said resistance wires. As a result, the resistances or resistance values of the two resistance wires 37 and 33 will change and the evaluation device 50 detects the region A, that is to say the region in which the resistance wires 37 and 33 cross, as a region of increased temperature and reports this to a superordinate central unit which then prompts further actions if required.

FIG. 3 shows an arrangement having a comparatively large number of resistance wires; the number of resistance wires depends on the size of the area to be covered and, if appropriate, on the number of electrical units inside the withdrawable part. It goes without saying that only two resistance wires or three resistance wires may also be respectively arranged in each direction.

The individual resistance wires are produced from a material whose resistance value changes as the temperature increases. In this case, all of the resistance wires may be produced from the same material or may be produced from different materials having different resistance values.

Figure 4:
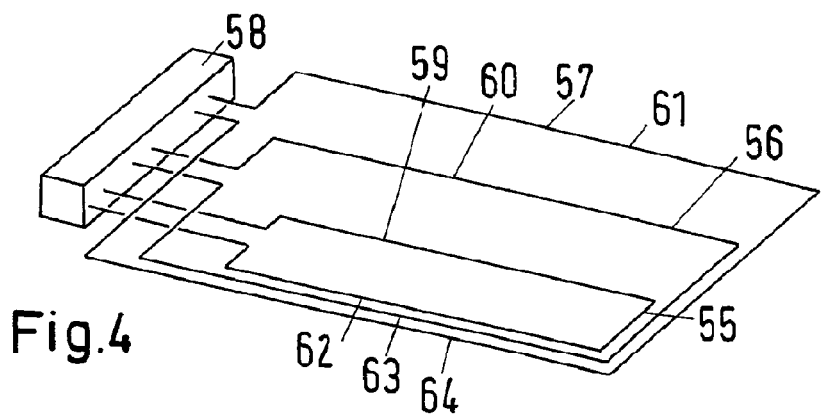

FIG. 4 shows an arrangement of three resistance wires which are composed of the same material and are arranged in the form of a small loop 55, a medium loop 56 and a large loop 57. In this case, on account of the wire length, the small loop has a resistance R1, the medium loop 56 has a resistance value R2 and the large loop 57 has a resistance value R3. The loops 55 to 57 are arranged in such a manner that the loops are elongated rectangles, the sections 59, 60 and 61 of the loops 55 to 57 running above the withdrawable part, whereas the other sections 62 to 64 which run parallel to the sections 59 to 61 are laid in the region of one of the side walls of the withdrawable part. The sections 59, 60 and 61 run parallel to one another at the same distance, with the result that the three sections 59 to 61 are uniformly distributed over the withdrawable part. The sections 62, 63 and 64 may preferably run parallel to the front wall 15 of the withdrawable part. The ends of the loops 55, 56 and 57 are connected to an evaluation unit 58 in which the resistance values of the individual loops are detected.

In the arrangement illustrated in FIG. 4, only one line region, namely the line region under the sections 59 and/or 60 or 61, can be monitored; it goes without saying that it is also possible to arrange an arrangement like that illustrated in FIG. 4 in such a manner that the sections corresponding to the sections 59, 60 and 61 run perpendicular to the sections 59, 60 and 61, as a result of which a structure in the form of a mesh or a grid like the structure illustrated in FIG. 3 is likewise produced again. The ends of the loops of the second arrangement are likewise connected to the evaluation unit 58.

Figure 5:
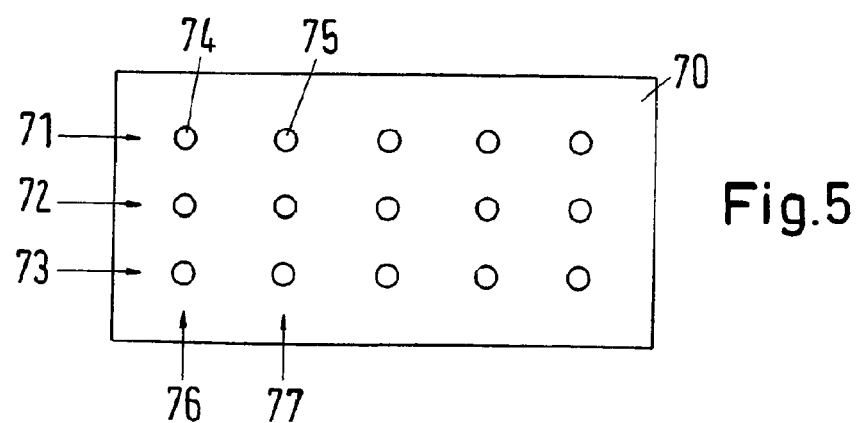

FIG. 5 shows another refinement of the invention. Temperature sensors 74, 75 etc. are arranged on a carrier 70 in respective first rows 71, 72 and 73, the temperature sensors 74 of the three rows 71 to 73 forming a row 76 which runs perpendicular thereto and runs parallel to further rows 77 which are formed by the temperature sensors 75 of the rows 71 to 73. It goes without saying that the carrier 70 has openings which enable an essentially loss-free flow from the underlying electrical units to the thermosensors 74, 75.

Instead of the arrangement of the temperature sensors 74, 75 as illustrated in FIG. 5, the temperature sensors may also be uniformly distributed above the withdrawable part 10 in another manner, as a result of which the end effect achieved is the same measuring effect as in the arrangement according to FIG. 5 or the arrangements according to FIGS. 3 and 4.

In the arrangement according to FIG. 5, three first rows 71, 72 and 73 and five second rows 76, 77 which run perpendicular thereto (the three further rows are not provided with reference numerals) are provided; it goes without saying that it is also possible to increase or reduce the number of sensors depending on the size of the withdrawable part.

The invention is described with reference to a withdrawable part of an electrical low-voltage switchgear cabinet; the device for measuring gas or air temperature can be used wherever different heat-generating units whose temperature has to be measured and monitored are arranged. This may also be the case in an electronic data processing device; an embodiment in the form of a wire mesh as shown in FIGS. 3 and 4 could be provided there, in particular.

The invention allows temperatures to be monitored and detected in a two-dimensional manner, the individual temperature sensors being arranged approximately on one plane. Accordingly, the invention can be used and applied anywhere in those spaces in which two-dimensional temperature detection is required and in which units which generate relatively high temperatures during faulty operation are accommodated.

The carrier may be a printed circuit board; and it is also possible to use a carrier film or to simply clamp the resistance wires to a frame.

The invention claimed is:

1. A device for measuring gas temperature in a casing box of a withdrawable part of a low-voltage switchgear cabinet having different heat-generating units disposed therein, the device comprising a temperature-measuring arrangement disposed substantially in a plane above the different heat-generating units, the temperature-measuring arrangement including a carrier having a plurality of openings configured to allow rising gas heated by the different heat-generating units to flow past a matrix of temperature sensors that are uniformly distributed on the carrier and configured to measure a temperature of the rising gas.

2. The device as recited in claim 1, wherein the carrier includes a mesh or grid and the temperature sensors are fitted in the mesh or grid such that the temperature sensors are disposed above the casing box.

3. The device as recited in claim 2, wherein the casing box includes a front wall and the matrix of temperature sensors are disposed in longitudinal rows and transverse rows, the longitudinal rows running substantially parallel to the front wall and the transverse rows running substantially transverse to the front wall.

4. The device as recited in claim 3, wherein the carrier is a printed circuit board.

5. The device as recited in claim 3, wherein the carrier is a film.

6. The device as recited in claim 1, wherein the carrier includes a grid shape and the temperature sensors are disposed on grid points of the carrier.

7. The device as recited in claim 6, wherein the matrix includes a plurality of resistance wires.

8. The device as recited in claim 7, wherein the plurality of resistance wires are formed of the same material.

9. The device as recited in claim 1, wherein the temperature measuring arrangement includes a plurality of resistance wires.

10. The device as recited in claim 8, wherein the plurality of resistance wires are disposed in a mesh or grid.

11. The device as recited in claim 8, wherein the temperature measuring arrangement includes a plurality of first resistance wires disposed in first loops, each first loop surrounding a first area form, each first area form including a first side edge and a substantially parallel second side, the first side edges being disposed closely to each other and the second side edges being disposed at a distance from one another such that the second side edges are distributed above the casing box.

12. The device as recited in claim 11, wherein the first area form of each first loop is rectangular.

13. The device as recited in claim 11, wherein the temperature measuring arrangement includes a plurality of second resistance wires disposed in second loops, each second loop surrounding a second area from each second area form including a third side edge and a fourth side edge, wherein the third side edge and fourth side edge of each area form is perpendicular to the first side and second side edge.

14. The device as recited in claim 1, wherein each temperature sensor is a resistance wire.

15. An electrical low-voltage switchgear cabinet comprising:
 a casing box of a withdrawable part of the low-voltage switchgear cabinet;
 a plurality of different heat-generating units disposed in the casing box;
 a device for measuring gas temperature in the casing box, the device including a temperature-measuring arrangement disposed substantially in a plane above the different heat-generating units, the temperature-measuring arrangement including a carrier having a plurality of openings configured to allow rising gas heated by the different heat-generating units to flow past a matrix of temperature sensors that are uniformly distributed on the carrier and configured to measure a temperature of the rising gas in the casing box; and
 an evaluation unit configured to emit an alarm signal in response to a temperature of the rising gas exceeding a threshold value.

16. The device as recited in claim 15, wherein the temperature measuring arrangement includes a plurality of resistance wires.

17. The device as recited in claim 16, wherein the plurality of resistance wires are disposed in a mesh or grid.

* * * * *